United States Patent [19]

Wood et al.

[11] 4,037,740
[45] July 26, 1977

[54] STACK FEEDING APPARATUS

[75] Inventors: William Robert Wood; Edward Clyde Ryan; Marvin Lee Bigbee, all of Ankeny, Iowa

[73] Assignee: Deere & Company, Moline, Ill.

[21] Appl. No.: 608,580

[22] Filed: Aug. 28, 1975

[51] Int. Cl.² .......................... B60P 1/00; A01F 29/00
[52] U.S. Cl. ................................ 214/83.14; 214/83.26; 214/520; 239/672; 241/101.7; 241/283
[58] Field of Search ............... 214/83.14, 83.26, 83.36, 214/519, 520, 521, 522; 241/101.7, 277, 274, 283, 282.1; 83/23; 119/52 R, 52 B; 239/671, 672, 680; 198/172, 174, 511, 519, 520, 719, 728

[56] References Cited

U.S. PATENT DOCUMENTS

| 1,549,877 | 8/1925 | Hurst et al. | 198/174 |
| 2,496,876 | 2/1950 | Kayser | 214/520 |
| 2,503,129 | 4/1950 | Pautz | 214/83.26 |
| 3,209,932 | 10/1965 | Schiltz | 214/83.36 |
| 3,741,051 | 6/1973 | Brooks et al. | 241/101.7 |
| 3,773,269 | 11/1973 | Brooks et al. | 241/282.1 |
| 3,920,190 | 11/1975 | Kanengieter et al. | 241/101.7 |

Primary Examiner—Stephen G. Kunin
Assistant Examiner—Charles E. Frankfort

[57] ABSTRACT

Compressed livestock feed such as hay in stack form is severed from the stack, dislodged and transferred to the side of the stack for feeding. A stack is loaded on the stack mover bed and advanced to a position partially underlying the feeding conveyor. The conveyor is then activated and lowered. Conveyor mounted blades sever the underlying stack portion from the stack and a conveyor mounted raking device dislodges the severed stack portion and transfers it to the side of the stack for discharging.

19 Claims, 7 Drawing Figures

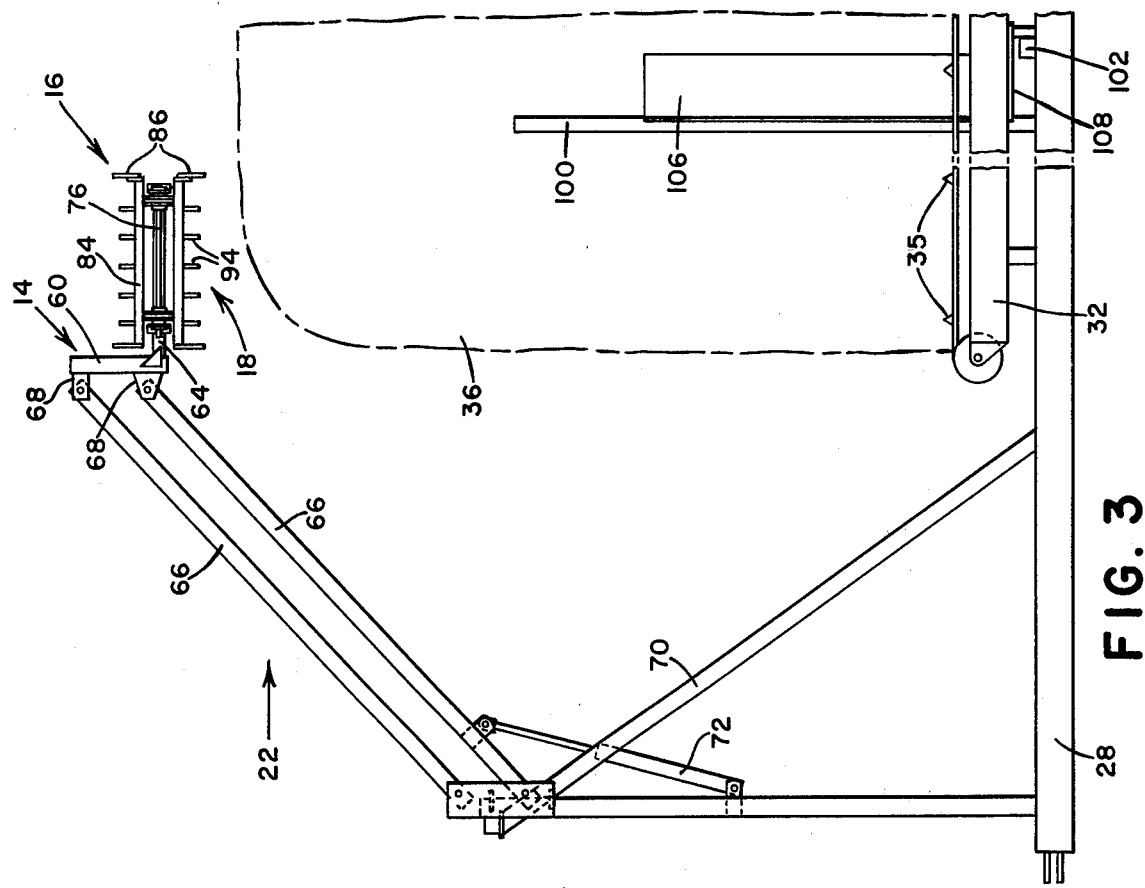
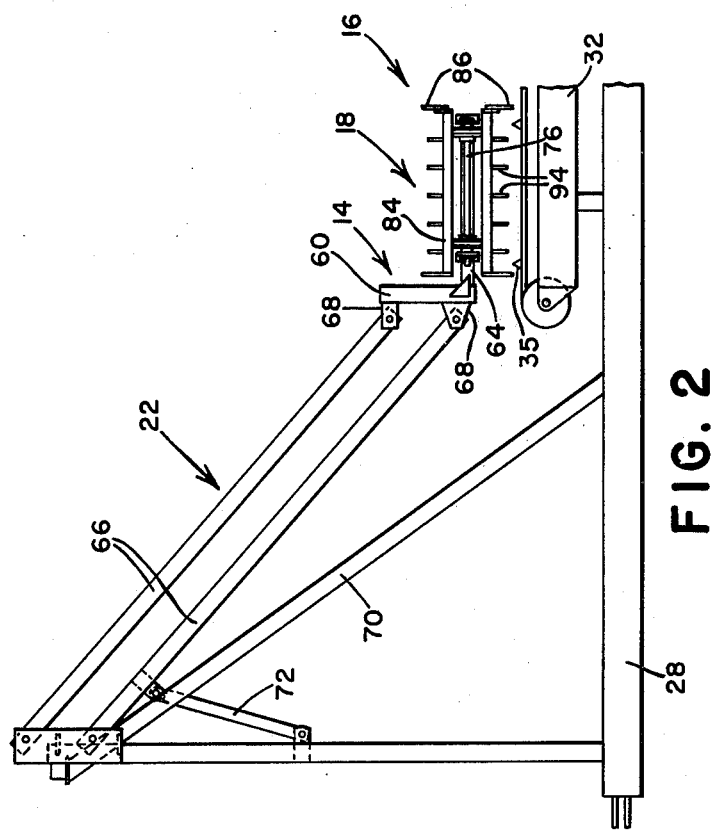

STACK FEEDING APPARATUS

BACKGROUND OF THE INVENTION

This invention relates generally to agricultural implements and more specifically to an apparatus for feeding crop materials from a stack.

Today's farmers must utilize equipment capable of efficiently planting and harvesting large areas with a minimum of manpower requirements. Recent innovations in hay handling have provided the farmer with implements capable of harvesting and storing hay in compressed stacks weighing in excess of 10,000 pounds. Such stacks are compressed, can shed water and are therefore stored outside. To feed these stacks to livestock requires that the farmer either transport the livestock to the stack where it can be broken apart for feeding or alternatively, that the stack be transported to the cattle or livestock and broken apart for feeding.

Applicants' invention provides a means for raising such a compressed crop stack, transporting it to a feed bunk or range feeding area and thereupon in an operation manned by the farmer alone automatically separating the crop material from the stack and discharging the separated material in a single continuous smooth-flowing stream into the feed bunk or onto the ground for the cattle to feed upon.

Existing stack-feeding machines are also capable of raising a stack and transporting it to a feeding point. However, these machines utilize reciprocating sickle bars to slice sections of the stack off and distribute the sliced sections to the waiting livestock. Oftentimes, the stack of compressed crop material has a frozen surface, includes rocks or other solid objects, or is of a material difficult to cut such as corn stover. During the cutting and feeding of such material, the reciprocating sickle blades often jam or bind resulting in lost time for the farmer. Subsequently, the farmer must either replace the dull or broken blades or tolerate the recurrent downtime which results. In addition to those difficulties caused by the reciprocating blades, the farmer may incur other downtime caused by the necessity of stopping the feeding process to break up the large slices of stack material which have been cut from the stack, but have not broken up into smaller pieces.

It is therefore an object of the present invention to provide an implement for feeding compressed crop stacks which is capable of separating the crop material from a stack without jamming or incurring significant interruptions as a result of the separating process.

It is further an object to provide a stack feeder which is capable of separating equally well material from stacks comprised of hay or other crops including those materials difficult to cut such as stover.

Another object of the present invention is to provide a feeding mechanism which will effectively separate a predetermined amount of crop material from the stack and properly deliver it to a feed bunk or onto the ground in a continuous and smooth-flowing stream and in a noncompressed condition.

A still further object of the present invention is to provide a stack feeder capable of removing wide swaths of crop material from the stack as the stack is intermittently advanced so as to minimize the time required of an operator in feeding a stack onto the ground or into a feed bunk.

SUMMARY OF THE INVENTION

Applicants' invention provides for feeding hay or other stack crop material to livestock by picking up the stack, transporting it to a feed bunk or feeding area, advancing the stack forwardly along the bed of the transport vehicle, separating and raking the stack's forward portion from the stack layer by layer and conveying that separated material laterally from the stack whereupon it is discharged directly into a feed bunk or onto the open range.

BRIEF DESCRIPTION OF THE DRAWINGS

FIG. 2 is a partial side view of the alternate embodiment utilizing a boom and illustrating the feeding mechanism in a lowered position.

FIG. 3 is a side view similar to FIG. 2, but illustrating the feeding mechanism in an elevated position.

DESCRIPTION OF THE PREFERRED EMBODIMENT

Figure 1:
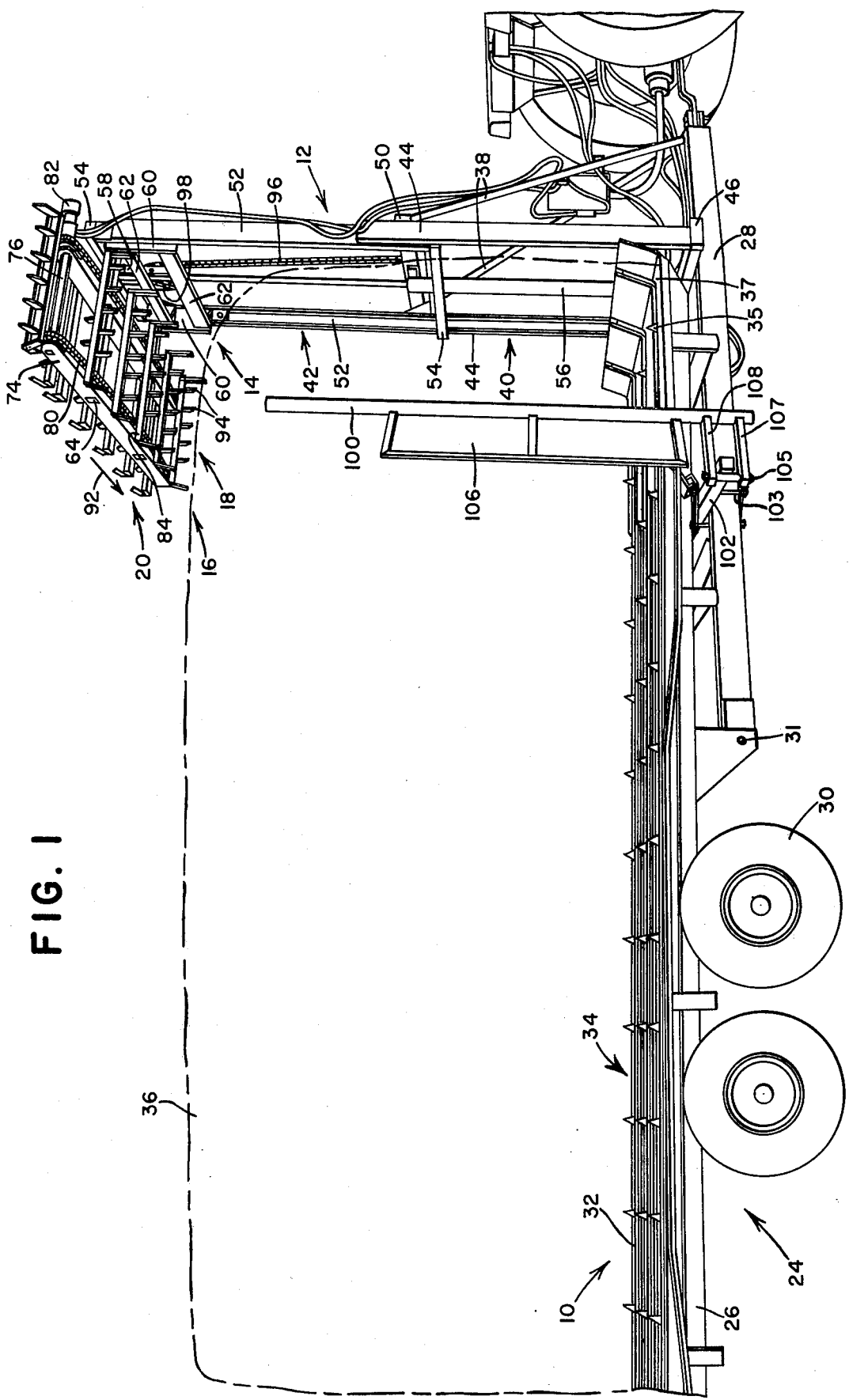
FIG. 1 is a side perspective view of the stack feeding apparatus.
Figure 4:
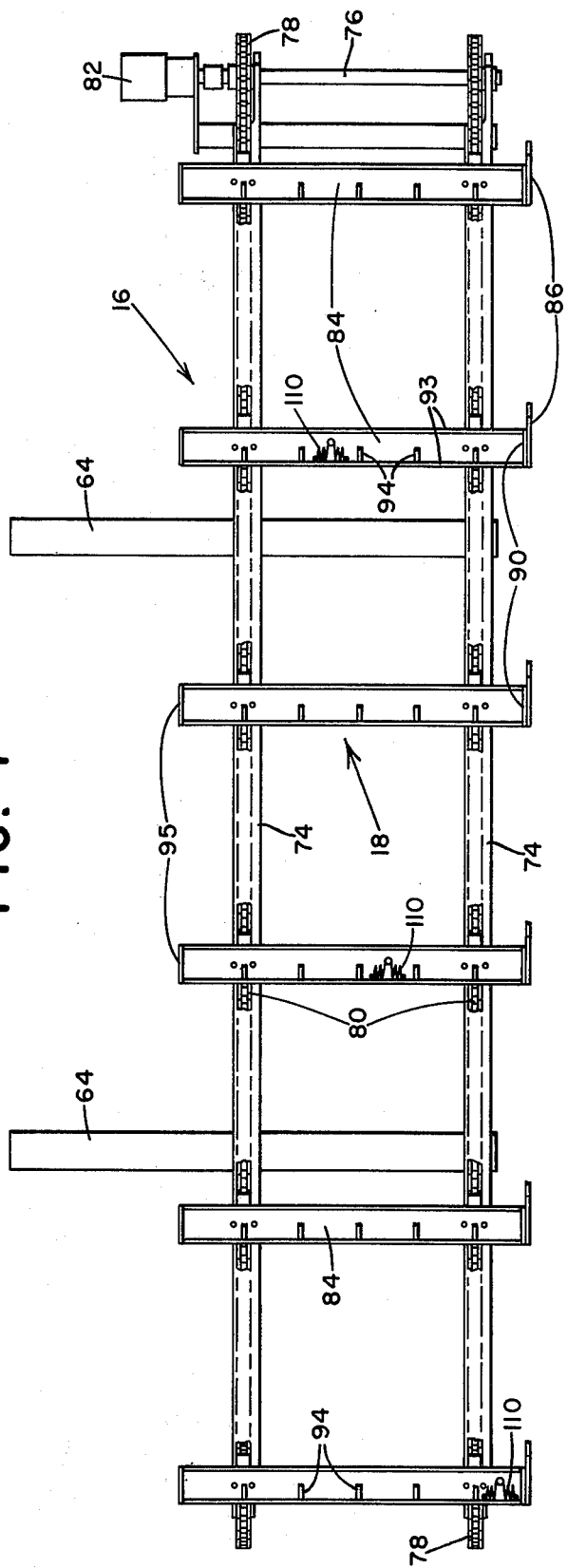
FIG. 4 is a top view of the feeding conveyor illustrating the raking means.
Figure 5:
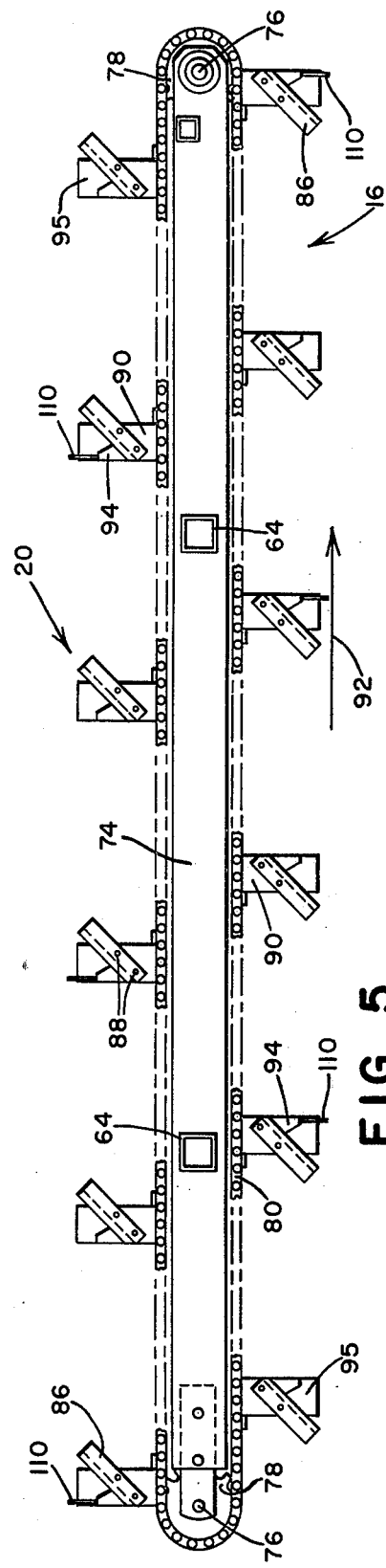
FIG. 5 is a side view of the feeding conveyor illustrating the cutting blades.
Figure 7:
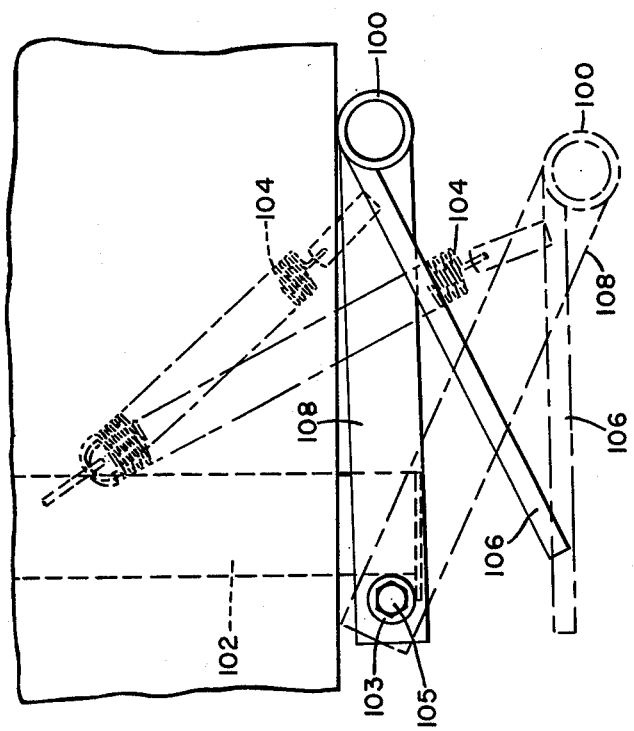
FIG. 7 is an enlarged top view of the shear bar support arm and biasing means, illustrating in solid lines the shear bar normal position and in dotted lines the shear bar position when deflected.
Figure 6:
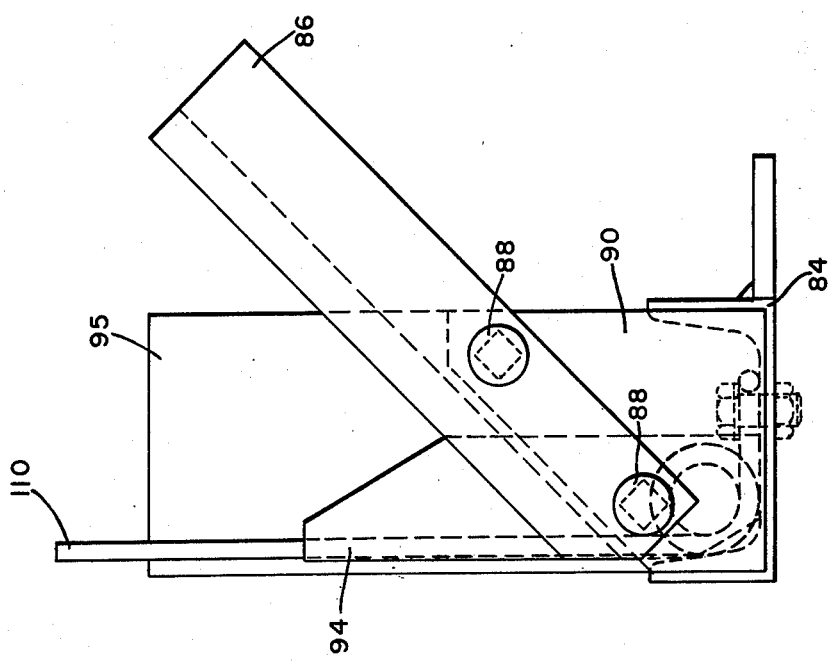
FIG. 6 is an enlarged side view of the slat, blade and rake assembly.

The preferred embodiment of the stack feeding apparatus is illustrated in FIG. 1 and includes a tiltable stack carrier or bed 10, an upstanding mast 12 attached at the forward end of the stack carrier or bed 10, a supporting structure 14 carried by the mast 12 and extending therefrom, a continuous conveyor 16 carried by the supporting structure 14, raking means 18 carried by the conveyor and a knife or cutting means 20 carried by the conveyor. An alternate embodiment is illustrated in FIGS. 2 and 3 and discloses therein a stack feeding apparatus which utilizes a boom 22 pivotally mounted on the mast 12 to carry the conveyor 16 and its raking means 18 and cutting means 20.

Referring again to FIG. 1, there is shown a tiltable stack carrier or bed 10 including a wheeled trailer 24 having a frame 26, a tongue 28, a wheel and axle assembly 30, and a stack support or mover 32 tiltable vertically on the wheels 30 about a horizontal axis. The frame 26 and support 32 are connected to the tongue 28 for relative movement about a transverse horizontal pivot 31. Hydraulically powered tilting means (not shown) is provided between the tongue and frame for tilting the support 32. The conveyor chain means 34 is composed of three transversely spaced conveyor chains, not shown in detail, having longitudinally spaced apart teeth 35 carried thereon for grasping and loading the stack 36 onto the support when the support is tilted. Forward end panels 37 of the support 32 are tilted upwardly so as to cause the teeth to disappear beneath the forward end of the support.

Rigidly secured to the forward end of the stack carrier tongue 28 is the upstanding mast 12. Brace members 38 extend upwardly from the tongue 28 and are inclined rearwardly, being attached at their rearward ends with the mast.

The mast 12 is comprised of a lower section 40 with an upper section 42 slidably received and mounted on rollers for reciprocable movement therein. Inwardly facing U-shaped channel members 44 comprise the upstanding sides of the lower mast section 40 and have their respective lower ends secured to a lower cross member 46 affixed to the tongue 28. Horizontally secured to the forward side of the channels is the brace support 50 whereupon the elevated end of brace member 38 is attached. The rectangularly shaped upper mast section 42 also includes U-shaped side channels 52 secured at their respective ends by cross members 54. The base end of a hydraulic cylinder 56 is supported on the lower mast section cross member 46 and its ram end is pivotally secured to the upper mast section cross member 54.

Slidably mounted on rollers within the U-shaped channels 52 of the upper mast section 42 are the side members 60 of the rectangularly shaped conveyor supporting structure or mount 14. Each side member 60 supports horizontally positioned cross pieces 62 which in turn support rearwardly extending cantilevered conveyor support bars 64.

In the alternate embodiment illustrated in FIGS. 2 and 3, a rearwardly extending boom 22 is pivotally supported on the mast to raise and lower the conveyor 16. The boom 22 includes arms 66 secured to brackets 68 which are attached to the supporting structure 14. The brace 70 is positioned between the stack carrier and mast 12 to stabilize the mast 12 as the conveyor is raised and lowered by hydraulic cylinder 72. The power means or hydraulic cylinder 72 has its base end secured to the mast and has its ram end pivotally attached to the lower boom arm 66. In operation, the conveyor operates identically on each embodiment.

A pair of transversely positioned, spaced apart, and parallel conveyor side frames 74 are supported by the cantilevered support bars 64. Extending between and supported by the side frames 74 at their respective ends and fore-and-aft extending shafts 76 having sprockets 78. Endless conveyor runs or chains 80 are trained over the sprockets 78 and are drivingly advanced by a power means in the form of a hydraulic motor 82 secured to one of the shafts 76. Parallel spaced apart cross bar members or slats 84 extend between the chains 80 and are secured at their ends to the chains 80 for movement therewith. The rear portion of each slat 84 extends rearwardly of the rear conveyor chain 80 and has attached thereto a blade member 86. The blade 86 is rigidly attached by bolts 88 to a bracket 90 welded to the slat 84 and extends downwardly and trailingly with respect to the conveyor's path of advancement as designated by the arrow 92. Welded to each cross slat 84 are outwardly extending and laterally spaced apart rigid rake members or fingers 94. Although rigid rake fingers 94 are disclosed in the current embodiment, resilient fingers may function more satisfactorily when loosely compacted materials are to be separated or accumulated crop material builds up on plates 37. For purposes of rigidity the salts 84 have flanges 93 on their transverse edges and relatively large plate members 95 that serve as a finger on their forward ends.

During the downstroke of the stack feeding conveyor, the conveyor support 14 will slidably descend between the channels 52 of the upper mast section 42. To control the descent rate of the conveyor 16, a chain 96 is fixed at its one end to the conveyor mount 14, trained over a pulley, attached to a bracket 98 depending from the upper mast cross member 54 and fixed at its other end to the lower mast brace support 50. Accordingly the conveyor mount 14 and its attached cross conveyor can descend no faster than permitted by the chain 96. Since the chain 96 is fixed at its one end and trained over a pulley supported on the slidable upper mast section, the conveyor will be able to descend at a rate in excess of that descent rate of the upper mast 42, but limited by the chain 96 length. A suitable restrictor can be placed in the hydraulic cylinder line to further limit the upper mast section's rate of descent.

Rearwardly of the cross conveyor 16 and attached to the stack carrier tongue 28 for pivotal rotation about a vertical axis is an upwardly extending shear bar 100. An outwardly projecting beam 102 fixed to the tongue 28 carriers a vertical tube 103 through which a pivot pin 105 extends. A pair of parallel horizontal arms 107 and 108 are fixed at one of their respective ends to the upper and lower ends of pin 105 and are fixed at their respective remote ends to bar 100. A biasing means or spring 104 between the arms 107 and 108 and beam 102 acts to bias the bar 100 towards the stack mover or support 32. Secured along the length of the bar 100 is a guide means or wing 106 engageable with the advancing stack for deflecting the bar 100 aside as a misplaced advancing stack 36 engages the wing 106.

OPERATION OF THE STACK FEEDER

In operation, the stack feeding apparatus is attached to a tractor or other towing vehicle. It is then backed into a stack 36 while the mover 32 near portion is tilted downwardly. Simultaneously the operator will activate the conveyor chain means to transfer the stack 36 onto the mover 32 as he continues to back the stack mover under the stack 36. Before moving the stack 36 to a feeding point, the stack mover 32 with its loaded stack will be returned to a horizontal position.

Once the stack 36 has been transported to a feeding point or feed bunk, the conveyor chain means 34 will be activated to advance the stack toward the mast 12 to a position where a portion of the stack will underlie the conveyor raking means 18 and the spring loaded shear bar 100 will abut the stack edge to stabilize the stack during the cutting operation. Should the stack be loaded slightly off to the shear bar side, the guide means 106 will be first engaged as the stack is advanced and will accordingly deflect the shear bar 100 aside to prevent the bar 100 from being bent forwardly by the advancing stack.

Having elevated the conveyor 16 prior to loading the stack, the operator will now begin to separate and feed the stack by allowing the hydraulic cylinder 56 to retract. As the hydraulic cylinder 56 retracts, the upper mast 42 section descends within the lower mast channels 44. The conveyor mount or support 14 will also descent within the upper mast section 40, but at twice the descent rate of the upper mast section 40 since the chain 96 is arranged to permit the mount 14 to descent within the upper mast 42 at the same rate as the upper mast 42 descends within the lower mast channels 44.

Upon initiating the conveyor descent the operator will activate the hydraulic motor 82 to drive the conveyor chain's knives 86 and rake fingers 94. As the conveyor 16 descends and contacts the stack top, the knives 86 will begin to cut transversely with respect to stack advancement through the stack. To insure a shearing or cutting action, the shear bar 100 is provided to stabilize the stack as the knives 86 are moved through the stack material. The rake fingers 94 concurrently dislodge the severed stack material from the stack and rake it across the stack, throwing it off the stack and onto the ground or into the feed bunk as the operator advances the stack cutting apparatus along the feed bunk or across the range.

Neither conveyor 16 in either embodiment is forced nor powered through its downstroke, but each descend under the influence of gravity to prevent jamming or binding of the knives 86 and fingers 94. The rate of the conveyor descent is governed by the ability of the conveyor 16 and its rake 18 to separate the crop material from the stack. Should the stack material be easily separated and dislodged, the conveyor 16 in FIG. 1 and its support 14 will descent more rapidly than the upper mast 42 section, but limited by the chain suspension arrangement. Under similar circumstances, the conveyor 16 of FIG. 2 will descend limited by the escape of restricted hydraulic fluid from the hydraulic cylinder 72. Because the conveyor 16 in FIG. 1 must traverse in its downstroke, the distance between the top of the upper mast 42 and the bottom of the lower mast 40, its maximum possible descent rate would be twice that rate realized by the upper mast section 42 which is itself limited by the hydraulic cylinder 56 retraction rate. Should feeding difficulties be encountered, either conveyor can easily be raised by extending its respective hydraulic cylinder ram.

As each subsequent layer of the underlying stack is dislodged and transferred by the raking fingers 94 to the side of the stack, it will be dropped alongside the advancing stack feeder and the cantilevered conveyor will descend by virtue of its own weight. As the conveyor near the surface of the stack support, the mount 14 will bottom out in the lower mast channels 44 and prevent engagement of the conveyor fingers 94 and 95 with the stack support 32. To facilitate removal of the majority of the stack material, the series of upwardly sloping plate sections 37 at the forward end of the support 32 raise the crop material above the teeth 35 of the chain conveyor means 34 to allow the conveyor fingers 94 to rake the crop material from the stack support 32. Since the teeth 35 of the chain conveyor recess beneath the forward end plates 37 of the support 32, there will be no interference between those teeth and the fingers 94 or knives 86 on the conveyor 16. Occasionally, loose stack material will accumulate on the forward plates 37 since the rigid fingers 94 and 95 will not project below the top of the chain teeth 35 during the raking process. This accumulation can prevent the stack from advancing to the forward end of the plates 37. The conveyor cannot be lowered to permit the rigid fingers 95 to remove the material since the teeth 35 or plates 37 could be damaged. To remove the accumulated material resilient fingers 110 can be added to several of the conveyor cross slats 84. The ends of the resilient fingers 110 will project beyond the rake fingers 95 sufficiently to remove the loose material, but bend upwardly sufficiently during the stack dislodging process to allow the rake fingers 94 and 95 to perform the disloding process.

After the conveyor has completed its downstroke and the underlying stack portion has been separated and transferred to the side, the operator again activates the hydraulic cylinder 56 to raise the upper mast section 42 and its carried conveyor to the elevated position. That remaining portion of the stack on the stack carrier is then advanced and the operating procedure again repeated until the stack is totally separated and transferred to the side of the stack carrier for feeding of livestock or other animals.

We claim:
1. An apparatus for unloading a harvested crop stack comprising: a mobile elongated stack carrier having front and rear portions; a mast at one end of the carrier; structure carried by the mast, movable between the ends of said mast, and extending therefrom to overlie said carrier; means for advancing the stack along the carrier to position a portion of said stack in underlying relation to said structure; a continuous powered conveyor carried by said structure and movable therewith, having upper and lower runs traversing paths transverse to the direction of stack advancement; and raking means including knife means carried by said conveyor for serving the underlying stack portion from the stack, and for progressively dislodging said portion during downward movement of the structure, and for transferring said disloged portion away from said stack.

2. The invention defined in claim 1 wherein the knife means includes blade members rigid with the conveyor runs and movable therewith, said blade members spaced along the runs transversely to the path of stack advancement and inclined rearwardly.

3. The invention defined in claim 1 wherein the raking means includes a plurality of substantially rigid finger members and a plurality of substantially resilient finger members extending outwardly from said conveyor runs with the ends of said resilient members disposed outwardly of the ends of said rigid finger members.

4. The invention defined in claim 1 wherein the carrier supports an upright bar adjacent one side, said bar being spacedly separated from and pivotally supported by said carrier for movement between a first position adjacent thereto and a second position spacedly removed therefrom.

5. The invention defined in claim 4 wherein the bar is normally biased towards the first position by spring means.

6. The invention defined in claim 4 wherein the bar is provided with means engageable by an advancing stack, said means rotating said bar about its pivotal axis as said stack advances towards said conveyor.

7. An apparatus for unloading a harvested crop stack comprising: a mobile elongated stack carrier having a front and rear portion; a mast at the front of the carrier; structure carried by the mast, movable between the ends of said mast and extending therefrom to overlie said carrier; means for advancing the stack along the carrier to position a portion of said stack in underlying relation to said structure; a pair of powered parallel endless conveyor chains carried on sprockets rotatably secured to said structure and traversing a path transverse to the direction of stack advancement; a plurality of cross bar members extending between, secured to and carried by said chains; knife means carried by said bar members and movable therewith for severing the underlying stack portions from the stack; a plurality of outwardly extending substantially rigid finger members secured to each bar member; and an upright structure mounted on the carrier adjacent one side thereof, fore-and-aft spaced from said chains.

8. The invention defined in claim 7 wherein the upright structure is a bar spacedly separated from and pivotally supported by the stack carrier for movement between a first position adjacent said carrier and a second position spacedly removed from said carrier.

9. An apparatus for unloading a harvested crop stack comprising: a mobile elongated stack carrier having front and rear portions; a boom pivotally carried by the carrier and extending in overhanging relationship to the stack carrier, for swinging movement about a horizontal axis; power means between the carrier and boom for swinging the boom; structure carried by the boom, and extending therefrom to overlie said carrier; means for advancing the stack along the carrier to position a portion of said stack in underlying relation to said structure; upright structure mounted on the carrier adjacent one side thereof and spaced from one end thereof for bearing against the side of a stack; a continuous conveyor carried by said structure and movable therewith, having upper and lower runs traversing paths transverse to the direction of stack advancement; and raking means carried by said conveyor and movable therewith, for progressively dislodging the underlying stack portion during downward movement of the structure, and for transferring said dislodged portion away from said stack.

10. The invention defined in claim 9 wherein the upright structure spacedly separated from and pivotally supported by the stack carrier for movement between a first position adjacent said carrier and a second position spacedly removed from said carrier.

11. A stack handling implement comprising: a mobile elongated stack carrying bed; a stack mover supported on the bed for shifting the stack longitudinally toward one end of the bed; and upright structure mounted adjacent to but spaced from said one end of the bed along one side thereof for bearing against a side of a stack; a transverse raking structure extending across the bed above said one end and composed of a driven continuous flexible element having upper and lower runs extending substantially the width of the bed with said lower run having stack engaging knife and rake members depending therefrom for severing a portion of said stack and for moving the severed portion toward the side of the bed having said upright structure; and means connected to the transverse raking structure for raising and lowering it.

12. The invention defined in claim 11 in which the bed includes a floor structure with an upwardly facing surface underlying stacks carried thereon, the stack mover is composed of at least one flexible element having an upper run extending between the ends of the bed and having upwardly projecting longitudinally spaced teeth for contacting the underside of the stack, and further characterized by the relative vertical position of the upper run portion and floor portion at said one end vertically diverges so as to reduce the vertical projection of said teeth above the floor portion.

13. The invention defined in claim 11 wherein the upright structure is spacedly separated from and pivotally supported by the stack bed for movement between a first position adjacent said bed and a second position spacedly removed from said bed.

14. A stack handling implement comprising: a mobile elongated stack carrying bed; a stack mover supported on the bed for shifting the stack longitudinally toward one end of the bed; an upright structure mounted adjacent to but spaced from said one end of the bed along one side thereof for bearing against a side of a stack; a transverse raking and conveying structure extending across the bed above said one end and having an endless element with an upper and lower run carrying stack engaging knife and rake members projecting therefrom for shearing a portion of said stack and for shifting said portion, said raking and conveying structure being driven to convey said portion transversely to the side of the bed having said upright structure; and means connected to the transverse raking and conveying structure for raising and lowering it.

15. The invention defined in claim 14 wherein the upright structure is spacedly separated from and pivotally supported by the stack bed for movement between a first position adjacent said bed and a second position spacedly removed from said bed.

16. An apparatus for unloading a harvested crop stack comprising: a mobile elongated stack carrier having front and rear portions; a mast at one end of the carrier; structure carried by the mast, movable between the ends of said mast, and extending therefrom to overlie said carrier; means for advancing the stack along the carrier to position a portion of said stack in underlying relation to said structure; a continuous powered conveyor carried by said structure and movable therewith, having upper and lower runs traversing paths transverse to the direction of stack advancement; raking means including knife means carried by said conveyor and movable therewith, for progressively dislodging the underlying stack portion during downward movement of the structure, and for transferring said disloged portion away from said stack; and an upstanding member carried near the edge of said stack carrier for stabilizing the stack as the raking means dislodges the underlying stack portion, said member being spaced from the underlying stack portion.

17. An apparatus for unloading a harvested crop stack comprising: a mobile elongated stack carrier having front and rear portions; a mast at one end of the carrier; structure carried by the mast, movable between the ends of said mast, and extending therefrom to overlie said carrier; means for advancing the stack along the carrier to position a portion of said stack in underlying relation to said structure; a continuous powered conveyor carried by said structure and movable therewith, having upper and lower runs traversing paths transverse to the direction of stack advancement; raking means carried by said conveyor and movable therewith, for progressively dislodging the underlying stack portion during downward movement of the structure, and for transferring said dislodged portion away from said stack; and an upstanding member pivotally carried near the edge of said stack carrier for stabilizing the stack as the raking means dislodges the underlying stack portion, said member being spaced from the underlying stack portion and movable between positions first adjacent to and second spaced from said carrier.

18. The invention defined in claim 17 wherein the upstanding member is normally biased towards the first position by spring means and is moved to its second position by an advancing stack edge portion.

19. The invention defined in claim 17 wherein the upstanding member is provided with means engageable by said advancing stack, said means rotating said member about its pivotal axis as said stack advances toward said conveyor.

* * * * *

UNITED STATES PATENT OFFICE
CERTIFICATE OF CORRECTION

Patent No. 4,037,740          Dated   26 July 1977

Inventor(s) William Robert Wood and Edward Clyde Ryan and Marvin Lee Bigbee

It is certified that error appears in the above-identified patent and that said Letters Patent are hereby corrected as shown below:

Column 6, line 16, delete "serving" and insert --severing--.

Column 8, line 63, delete "toward" and insert --towards--.

Signed and Sealed this

Twenty-fifth Day of April 1978

[SEAL]

Attest:

RUTH C. MASON
Attesting Officer

LUTRELLE F. PARKER
Acting Commissioner of Patents and Trademarks